Aug. 19, 1969  W. A. WRIGHT, JR  3,462,116
SOLENOID VALVE AND METHOD FOR MAKING THE SAME
Filed Feb. 6, 1964

INVENTOR.
WILLIAM A. WRIGHT, JR.
BY Thomson & Sclone
ATTORNEYS

United States Patent Office

3,462,116
Patented Aug. 19, 1969

3,462,116
SOLENOID VALVE AND METHOD FOR
MAKING THE SAME
William A. Wright, Jr., Clifton Springs, N.Y., assignor to
Wright Components, Inc., Clifton Springs, N.Y., a corporation of New York
Filed Feb. 6, 1964, Ser. No. 342,944
Int. Cl. F16k 31/06
U.S. Cl. 251—139  9 Claims This invention relates to an improved solenoid valve construction and method for making the same.

It is one object of this invention to provide an improved solenoid valve construction.

A significant object of this invention is to provide a solenoid valve construction in which the valve body is rotatably mounted with respect to the solenoid which actuates the valve.

A further significant object of this invention is to provide an improved solenoid valve construction in which the flow pattern of the fluid being controlled passes through the core axis of the solenoid and provides rotatable adjustment of two valve bodies rotatably mounted with respect to each other and an opposite ends of the solenoid.

It is another object of this invention to provide an improved method of making a solenoid valve.

It is an important object of this invention to provide a novel method of rotatably mounting a valve on a solenoid to define a solenoid valve construction.

It will be readily understood, from the following description of this invention, that it provides a substantial improvement over known solenoid valve constructions in that the solenoid and/or the valve bodies at either end thereof may be rotatably adjusted to any desired position and may be readily threaded onto a pipe or conduit.

Other objects and advantages of this invention will be particularly set forth in the claims and will be apparent from the following description, when taken in connection with the accompanying drawings, in which:

Figure 1:
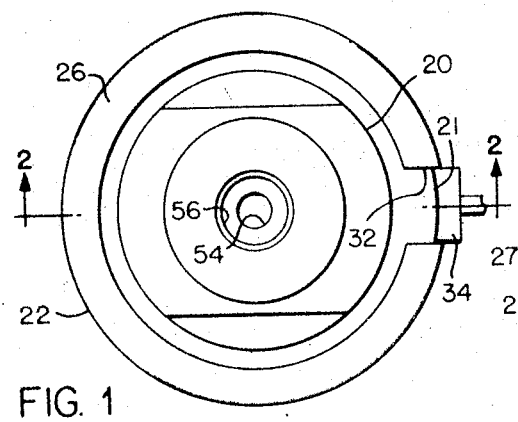
FIG. 1 is a top planar view of one embodiment of this invention.
Figure 3:
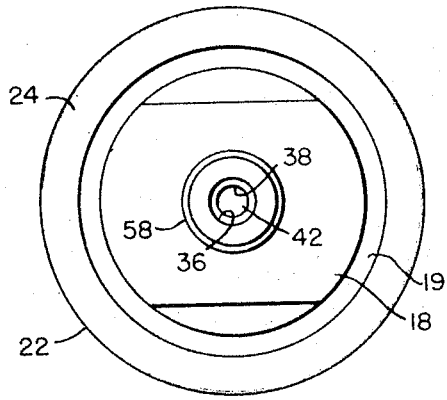
FIG. 3 is a bottom planar view of the FIG. 1 and FIG. 2 embodiment.
Figure 4:
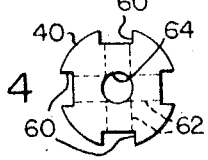
FIG. 4 is a top planar view of the plunger 40 of FIG. 2.

In the figures, a direct current solenoid is illustrated embodying the concept of this invention, it being understood that this invention is adaptable for use with alternating current solenoids by modifications well known in the art. This construction includes a cylindrical magnetic coil or solenoid 10 encapsulated in a protective coating 15, of, for example, epoxy resins. Lead wires 12 of solenoid 10 are connected to a source of direct current. Solenoid 10 has an axial cylindrical opening 16 extending vertically through substantially the center thereof.

A pair of valve body members 18 and 20 of magnetic composition are rotatably mounted at opposite ends of solenoid 10. Each valve body has a radially extending flange 19 and 21 respectively. A cylindrical housing member 22 slidably receives the solenoid 10 internally thereof. Cylindrical housing 22 has a pair of horizontal terminal flanges 24 and 26 formed by a crimping process described hereinafter. Flanges 24 and 26 are formed from cylindrical terminal portions of the housing 22, which terminal portions have larger inside diameters than the main body of the housing 22 thereby forming shoulders 25 and 27, respectively.

Upper valve body member 20 has an intermediate horizontal radially extending surface 28 abutting shoulder 27. Shoulder 25 is abutted by the upper surface of a circular magnetic plate 30 interposed between the solenoid 10 and valve body 18. Valve body flanges 19 and 21 are rotatably embraced between shoulders 25 and 27, respectively, and housing flanges 24 and 26, respectively.

In this manner, a novel solenoid valve construction is provided in which the valve body members 18 and 20 are rotatably adjustable relative to each other and with respect to the solenoid 10.

Housing 22 is provided with a U-shaped opening or cutout 32 through which protrudes a U-shaped in cross-section portion 34 of the epoxy resin capsule 15 which carries electrical lines 12.

Lower valve body member 18 has an axial opening comprising five concentric cylindrical bores of different diameter: a small diameter bore 36 through which passes the fluid to be controlled; a first intermediate size bore 37 for seating of a valve seat 38; a second intermediate size diameter bore 39 slidably receiving the lower end of a cylindrical valve or plunger 40; a third intermediate size diameter bore shouldering the lower end of cylindrical non-magnetic metal sleeve 48 interposed between the solenoid 10 and the plunger 40 which slidably receives the valve 40; and a large diameter bore receiving an O-ring 49 providing a seal between the nonmagnetic sleeve 48 and lower valve body 18 to prevent the escape of any fluids being controlled by this solenoid valve.

Figure 2:
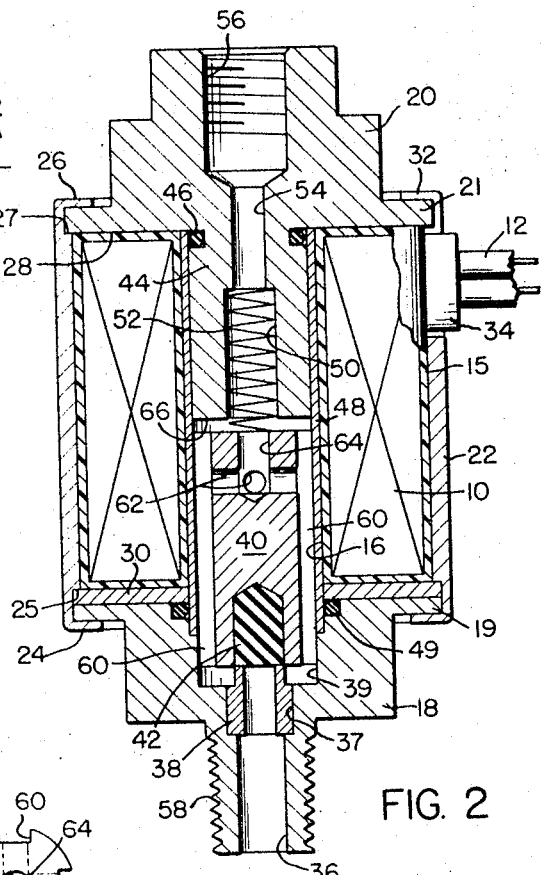
FIG. 2 is a sectional view taken along the line 2—2 of FIG. 1 looking in the direction indicated by the arrows.

Valve or plunger 40 has a bore extending centrally into the lower end thereof receiving a resilient valve plug 42 composed of, for example, synthetic rubber, which is adapted for engagement with, and closure of, valve seat 38 when valve 40 is in its closed position illustrated in FIG. 2.

Upper valve body member 20 has a vertically disposed cylindrical lower stop portion or stop member 44. Stop portion 44 has a circumferential groove at the upper end thereof receiving an O-ring seal 46 providing a seal between upper valve body 20 and the nonmagnetic sleeve 48. The upper valve body 20 is provided with an axially extending opening comprising three concentric bores of different diameters: a lower bore 50 of intermediate diameter in which is seated a compression spring 52 normally biasing the valve 40 into the valve-closed position of FIG. 2; a middle bore 54 of smaller diameter; and an upper threaded bore 56 of large diameter adapted to receive a male threaded attachment, pipe or connection.

The lower valve body member 18 is externally threaded at 58 to be threadedly received within a female threaded attachment, pipe or connection.

The valve 40 is provided in a known manner, with axially extending, radially spaced slots 60 communicating with radial bores 62 which in turn communicate with a vertical axially extending bore 64; thus, valve 40 serves as a flow-through valve. When solenoid 10 is electrically actuated, electromagnetic forces are transmitted through the valve bodies 18 and 20 to valve 40 in opposition to compression spring 52 and the valve 40 is elevated to engage a lower surface 66 of stop portion 44 of upper valve body 20 at which position the fluid to be controlled passes from lower valve body 18 through lower bore 36; valve seat 38; second intermedite bore 39 of valve body 18; axial slots 60, radial bores 62, and axial bore 64 of flow-through valve 40 and then through the axial opening of upper valve body 20.

Figure 5:
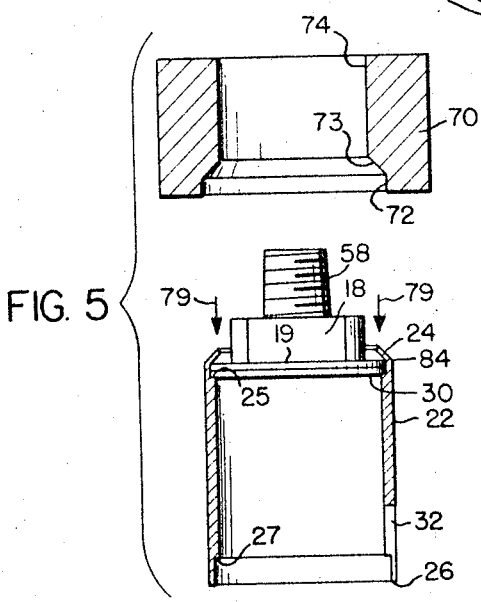
FIGS. 5 and 6 are inverted reduced side elevational views partly in section with parts removed of the FIG. 2 view and with parts added to illustrate the novel process by which this novel solenoid valve is manufactured.
Figure 6:
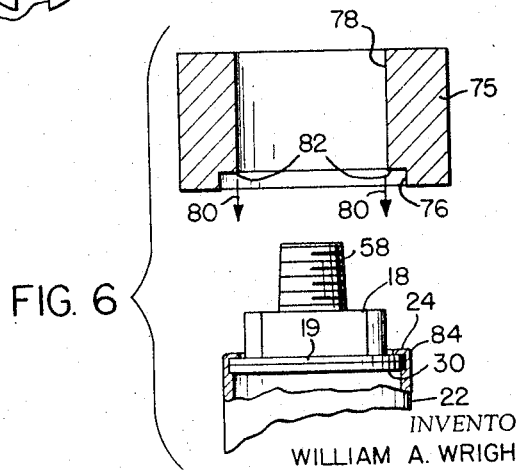

The following is a description of a novel process by which the heretofore described novel solenoid valve construction is manufactured. With reference to FIGS. 5 and 6 in which the valve assembly of FIG. 2 is inverted, the backup plate 30 is first received within the housing 22 where it is shouldered at, for example 25; thereafter the lower valve body member 18 is placed on top of plate 30 after which the partially assembled solenoid valve is brought into proper alignment under a crimping tool 70 having a vertical bore 74 for receiving valve body 18 and having a larger diameter concentric counterbore 72 with a bevel-shaped counterbore 73 intermediate the bore 74 and counterbore 72.

Larger diameter counterbore 72 slidably receives the outside surface of housing 22. When vertical downward force is applied by tool 70, the terminal or flange portion 26 of housing 22 is crimped by the conical or bevel-shaped counterbore 73 from a vertically upstanding position to a substantially 45° crimped position illustrated in FIG. 5 and a corner bend 84 is formed. After the tool 70 is axially removed from housing 22, the housing is then brought into axial alignment with a second crimping tool 75 (FIG. 6) having a small diameter bore 78 receiving valve body 20 and having a larger diameter counterbore 76 receiving the outside diameter of housing 22.

As illustrated by the arrows 79 of FIG. 5 and arrows 80 of FIG. 6, axial force is applied by an internal corner 82 of the shoulder formed between the smaller diameter bore 78 and larger diameter counterbore 76 to compress the terminal portion or flange 24 of housing 22 downwardly from the FIG. 5 position to the FIG. 6 position. It will be understood that as downward force is applied by the corner 82 to the upper ends of shoulders 26 at the position illustrated by the arrow 79, the bend 84 tends to bow upwardly away from the flange 19 of valve body member 18 such that, when formed into the final position illustrated in FIG. 6, the flange 19 and back-up plate 30 are rotatably embraced between the shoulder 25 and flange 26 of housing 22.

The partially assembled construction illustrated in FIG. 6 is then inverted to the position illustrated in FIG. 2 and the remainder of the internal parts are received within the partially assembled construction and the second flange 26 is then formed in the same manner just described with regard to flange 24.

This novel construction provides a greatly improved solenoid valve and method for making the same which is very economical and simple to manufacture with the advantage of having a flow-through solenoid valve in which the terminal valve-body portions are rotatable with respect to each other and with respect to the solenoid.

While I have shown and described the preferred forms of mechanism of the invention, it will be apparent that various changes and modifications may be made therein, particularly in the form and relation of parts, without departing from the spirit of the invention as set forth in the appended claims.

I claim:
1. A solenoid valve comprising:
 (a) a housing;
 (b) a solenoid with an axially extending opening and mounted in said housing;
 (c) flow-through valve means in said opening;
 (d) a valve body member having an opening and a valve seat communicating with one end of said solenoid opening;
 (e) a valve stop member having an opening communicating with the other end of said solenoid openings; and
 (f) said housing having flanges on opposite ends thereof rotatably embracing said valve body member and valve stop member.

2. A solenoid in accordance with claim 1 including a spring interposed between said valve means and valve stop member.

3. A solenoid valve comprising:
 (a) a solenoid with an axially extending opening;
 (b) a flow-through valve means in said opening;
 (c) a pair of valve body members, each having an opening communicating with each other through said solenoid opening, each valve body member having a circumferential flange; and
 (d) a housing embracing said solenoid and having flange portions at opposite ends thereof rotatably embracing said valve body flanges.

4. A solenoid valve in accordance with claim 3 in which said housing flanges comprise opposite ends of said housing crimped substantially normal to the housing.

5. A solenoid valve in accordance with claim 3 in which said housing has two shouldered portions coactive with said housing flanges to rotatably embrace said valve body flanges.

6. In a solenoid valve construction having a solenoid with an axially extending opening receiving a flow-through valve means, an improvement comprising, a pair of valve body members, each having an opening communicating with each other through said solenoid opening; at least one of said members being rotatably mounted with respect to said solenoid, a housing embracing said solenoid and having flange portions at opposite ends thereof rotatably embracing both of said valve body members.

7. A solenoid valve in accordance with claim 6 in which said housing has two shouldered portions coactive with said housing flanges to rotatably embrace said valve body flanges.

8. In a method of making a solenoid valve, the step of crimping a free end of a solenoid housing around a portion of a valve body rotatably supportable within said housing with sufficient pressure to permit rotating between said housing and valve body.

9. In a method of making a solenoid valve, the steps of partially crimping a free end of a solenoid housing at a bevel angle around a portion of a valve body rotatably supportable within said housing and thereafter applying further crimping pressure to the free end of the partially crimped end with only sufficient pressure to permit rotation between said housing and valve body.

References Cited

UNITED STATES PATENTS

| | | | |
|---|---|---|---|
| 2,638,125 | 5/1953 | Parsons | 251—139 |
| 2,687,277 | 8/1954 | Premer | 251—139 |
| 2,622,618 | 12/1952 | Ghormley | 251—30 |
| 2,751,767 | 6/1956 | Hedden | 285—382 X |
| 2,860,850 | 11/1958 | Rhodes et al. | 251—141 X |
| 3,001,757 | 9/1961 | Ball | 251—140 |
| 3,012,581 | 12/1961 | Wilson | 251—139 X |
| 2,449,438 | 9/1948 | Wisegarver | 251—129 X |
| 2,607,368 | 8/1952 | Mayer | 251—139 |

FOREIGN PATENTS 778,194 7/1957 Great Britain.

HENRY T. KLINKSIEK, Primary Examiner

U.S. Cl. X.R.

29—157.1